US007708627B2

(12) United States Patent
Lind

(10) Patent No.: US 7,708,627 B2
(45) Date of Patent: May 4, 2010

(54) METHOD, APPARATUS, AND PROGRAM PRODUCT FOR PRESENTING GAMING RESULTS THROUGH A PLAYER DECISION FIELD

(75) Inventor: Jefferson C. Lind, Austin, TX (US)

(73) Assignee: Multimedia Games, Inc., Austin, TX (US)

( * ) Notice: Subject to any disclaimer, the term of this patent is extended or adjusted under 35 U.S.C. 154(b) by 1301 days.

(21) Appl. No.: 11/201,484

(22) Filed: Aug. 11, 2005

(65) Prior Publication Data

US 2007/0060341 A1 Mar. 15, 2007

(51) Int. Cl.
*G06F 17/00* (2006.01)

(52) U.S. Cl. ........................................................ 463/16

(58) Field of Classification Search .............. 463/16–25
See application file for complete search history.

(56) References Cited

U.S. PATENT DOCUMENTS 3,349,485 A * 10/1967 Bettcher ...................... 30/138
4,178,683 A * 12/1979 Bettcher ...................... 30/276
4,930,789 A 6/1990 Harris et al.
6,273,425 B1 8/2001 Westfall et al.
6,575,463 B1 6/2003 Wintersteen
6,602,136 B1 8/2003 Baerlocher et al.
6,733,385 B1 5/2004 Enzminger et al.
6,761,633 B2 7/2004 Riendeau et al.
6,783,455 B2 8/2004 Glavich
6,942,566 B2 * 9/2005 Baerlocher et al. ............ 463/16
2003/0064795 A1 4/2003 Baerlocher et al.
2004/0152499 A1 8/2004 Lind et al.
2005/0137010 A1 6/2005 Enzminger et al.

OTHER PUBLICATIONS

Israeli Lottery Ticket, "ChishGard 'King's Way'" with Translation (6 Pages).
International Search Report for PCT/US2006/31005 dated Aug. 10, 2007 (2 Pages).
Written Opinion of the International Search Authority (PCT Rule 43bis. 1) for PCT/US2006/31005 dated Aug. 10, 2007 (4 Pages).

* cited by examiner

*Primary Examiner*—Ronald Laneau
(74) *Attorney, Agent, or Firm*—Russell D. Culbertson; Nathan H. Calvert; J P Cody

(57) ABSTRACT

A decision field is displayed having a number of result tokens spaced apart at different locations about the decision field, with each result token displaying a respective potential result. A decision point is also displayed within the decision field. This decision point is associated with two or more direction options which are preferably graphically depicted along with the decision point, and the player is enabled to make a direction input to select one of the direction options. Once the player has made their direction input to select one of the direction options associated with the decision point, a graphically depicted player token is caused to traverse the decision field along a player token path that includes a path portion associated with the selected direction option. The player token path may eventually intersect one or more result tokens of the decision field and the player is then awarded the potential result displayed by the respective result token or tokens intersected by the player token path.

23 Claims, 10 Drawing Sheets

METHOD, APPARATUS, AND PROGRAM PRODUCT FOR PRESENTING GAMING RESULTS THROUGH A PLAYER DECISION FIELD

TECHNICAL FIELD OF THE INVENTION

This invention relates to gaming machines and systems. More particularly, the invention relates to methods for presenting gaming results to a player through a graphic display that allows the player to make one or more choices that affect how the results will be presented. The invention also encompasses a gaming apparatus and program product for implementing the presentation method.

BACKGROUND OF THE INVENTION

A large number of different gaming machines have been developed to provide various formats and graphic presentations for conducting games and presenting game results. For example, numerous mechanical reel-type gaming machines, also known as slot machines, have been developed with different reel configurations, reel symbols, and paylines. More recently, gaming machines have been developed with video monitors that are used to produce simulations of mechanical spinning reels. These video-based gaming machines may use one or more video monitors to provide a wide variety of graphic effects in addition to simulated spinning reels, and may also provide secondary/bonus games using different reel arrangements or entirely different graphics. Video based gaming machines may also be used to show card games or various types of competitions such as actual or simulated horse races in which wagers may be placed. Game manufacturers are continuously pressed to develop new game presentations, formats, and game graphics in an attempt to provide high entertainment value for players and thereby attract and keep players.

SUMMARY OF THE INVENTION

The present invention includes a highly entertaining method of presenting gaming results. The entertainment value is achieved by enabling the player to enter one or more choices in the course of the game presentation, with the choices appearing to affect the result, or actually affecting the result for the player. Entertainment value is also enhanced in methods according to the invention by showing to the player a number of potential results in the game and providing a period of time in which some number of potential results, including high-value potential results appear to remain available as the actual result to be awarded. The present invention also encompasses both gaming apparatus and program products for implementing methods according to the invention.

A method embodying principles of the invention is implemented using one or more display devices such as CRTs, LCDs, plasma displays, or other types of display devices. The display device or devices used to show graphic elements according to the invention will commonly be associated with a gaming machine through which a player may participate in a game which generates results which are to be presented to the player in some fashion. As used in this disclosure and the accompanying claims, a gaming machine through which the present invention may be implemented will be referred to generally as a player station. The steps of displaying graphic elements according to the invention will refer to displaying such graphic element on one or more video display devices associated with a player station.

One preferred method according to the invention includes displaying a decision field having a number of result tokens spaced apart at different locations about the decision field, with each result token displaying a respective potential result. The method also includes displaying a decision point within the decision field. This decision point is associated with two or more direction options which are preferably graphically depicted along with the decision point, and the player is enabled to make a direction input to select one of the direction options. Once the player has made their direction input to select one of the direction options associated with the decision point, a graphically depicted player token is caused to traverse the decision field along a player token path that includes a path portion associated with the selected direction option. The player token path may eventually intersect one or more result tokens of the decision field and the player is then awarded the potential result displayed by the respective result token or tokens intersected by the player token path.

Different embodiments of the present method may include a wide variety of different features. For example, one form of the invention may display to the player one or more additional decision points within the decision field, with each respective additional decision point being associated with two or more additional direction options. In this variation of the present invention, the player is enabled to make a respective additional direction input for each respective additional decision point, and each respective additional direction input selects one of the additional direction options for the given additional decision point. The player token in this form of the invention is caused to traverse the decision field along a respective additional portion of the player token path associated with the respective selected additional direction option. Thus, this form of the present invention provides increased entertainment value by providing a higher degree of player interaction and suspense before the final result is identified for the player.

A method according to the present invention may further include identifying a result for a game play. This result for the game play may be identified by reading a result from an electronic lottery ticket record, by conducting a bingo game that includes a card representation assigned to the player, by applying some result generating algorithm, or in any other fashion. Regardless how the result for the game play is identified, the player token path will intersect a respective one of the result tokens that displays a respective potential result that is equal to the identified result, or will intersect multiple result tokens which together display potential results totaling to the result identified for the player.

Because a result that may be presented to a player according to the present invention may be identified from a game such as a lottery game, or bingo game for example, the player seeing results presented according to the invention may in fact be playing a lottery game or bingo game for example. A "play" or "game play" referenced in this disclosure will refer to the participation in the graphic presentation according to the invention regardless of the particular game used to identify a result to be awarded to the player.

Alternatively to identifying a result for a game play and then causing the player token path to intersect an appropriate result token showing a consistent potential result, methods according to the present invention may identify different results and map out different player token paths for each direction option available to a player at a decision point. In these forms of the invention, the player's selection of direction option affects the result the player will be awarded for their play.

An apparatus embodying the principles of the present invention includes a display device, a player input device, and a presentation processor, all preferably associated with a player station. The presentation processor causes the display device to display the above-described decision field with result tokens showing potential results, and also causes the display device to display a decision point within the decision field. The presentation processor also receives a direction input entered through the input device to select one of the direction options associated with the decision point. In response to the direction input, the presentation processor causes the display device to display the above-described player token traversing the decision field along a player token path that includes a path portion determined by the selected direction option. The player token path intersects a respective one of the result tokens displaying a respective potential result equal to a game play result to be awarded to the player. An apparatus according to the invention may receive results identified from a separate device or may include a result processor operatively connected for communication with the presentation processor, and adapted to communicate the game play result to the presentation processor in response to a result requesting input entered through the input device.

A program product embodying the principles of the invention is stored on one or more computer readable devices and preferably includes decision field program code, player interface program code, and player token control program code. The decision field program code is executable to cause a display device to display a decision field, decision point, and direction options as described above. The player interface program code is executable to receive a direction input initiated by a player which effectively selects one of the direction options associated with the decision point. The player token control program code is executable to display the above-described player token traversing the decision field along the player token path in response to the direction input. A program product according to the invention may receive results identified by other processes or may include result identifying program code executable to identify the game play results awarded through the presentation produced according to the invention.

These and other advantages and features of the invention will be apparent from the following description of preferred embodiments, considered along with the accompanying drawings.

DESCRIPTION OF PREFERRED EMBODIMENTS

The claims at the end of this application set out novel features which the Applicants believe are characteristic of the invention. The various advantages and features of the invention together with preferred modes of use of the invention will best be understood by reference to the following description of illustrative embodiments read in conjunction with the drawings introduced above.

Figure 1:
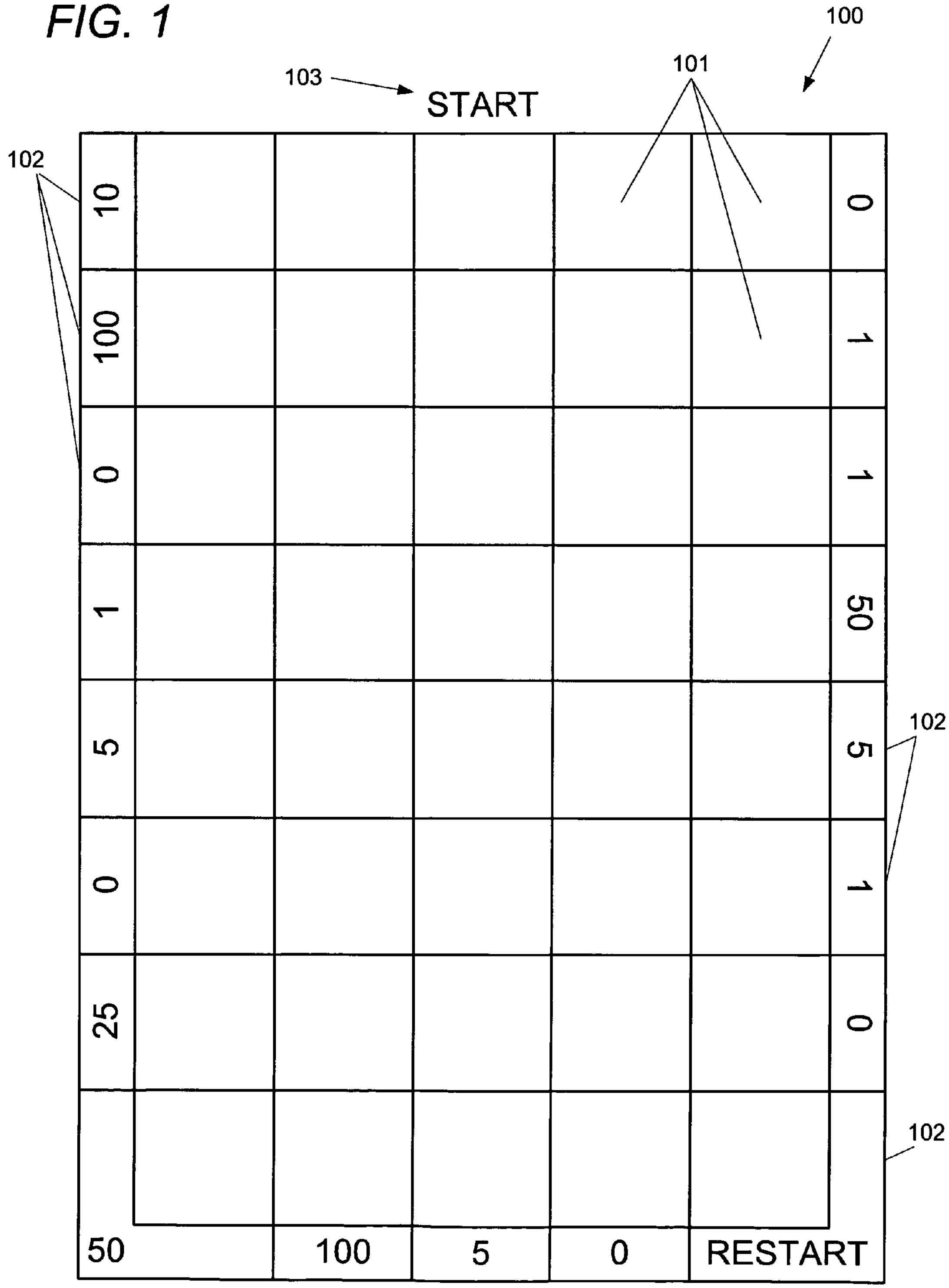
FIG. 1 is a somewhat diagrammatic representation of a decision field that may be displayed according to the present invention.

FIG. 1 shows a representation of a graphic display that may be produced in a method embodying the principles of the invention for revealing a gaming result to a player. The display shown FIG. 1 may be produced on a video display device associated with a player station that implements the invention. Example player stations and other components of a gaming system implementing the present invention will be discussed below with reference to FIGS. 9 and 10.

The example display shown in FIG. 1 includes a decision field 100 defined by a number of decision field locations 101. This illustrated decision field 100 is made up of a 5 by 8 grid of locations 101. A number of result tokens 102 are spaced apart along a portion of the periphery of decision field 100. FIG. 1 also shows a start position 103 that may define a starting location for a player token path across decision field 100. This player token path is described further below with reference to FIG. 3 and the example displays shown in FIGS. 4 through 7.

In the example decision field 100 shown in FIG. 1, each result token 102 displays a potential result for participating in a game. These results are shown in FIG. 1 as being numerical results. The numerical results may correspond to gaming credits or units of currency. For example, the upper left most result token 102 displays a result of "10" which may comprise 10 credits or 10 monetary units. A monetary unit may, for example, comprise one dollar or some fraction of one dollar. The result token 102 that is adjacent to the upper left most result token shows a value of 100 which may correspond to 100 gaming credits or 100 monetary units. It will be noted that some of the potential results shown by result tokens 102 are losing results, that is, results which return no value for the play in the game. Other results represented by result tokens include some payout ranging from a single credit or monetary unit up to a maximum of 100. It will also be noted that result token 102 at the lower right hand corner of the display 100 does not display a numerical value but rather an action indicator, in this case a "restart" indicator. Thus, not all result tokens 102 need be associated with a numerical value. In other forms of the present invention, a result token may display a symbol that indicates some physical item which may be awarded rather than a prize in credits or monetary units. In order to simplify the descriptions set out below, the numerical results described further in this document will be referred to as "credits," however, this reference to credits is not intended to limit the invention from encompassing other types of prizes that may be awarded.

Figure 2:
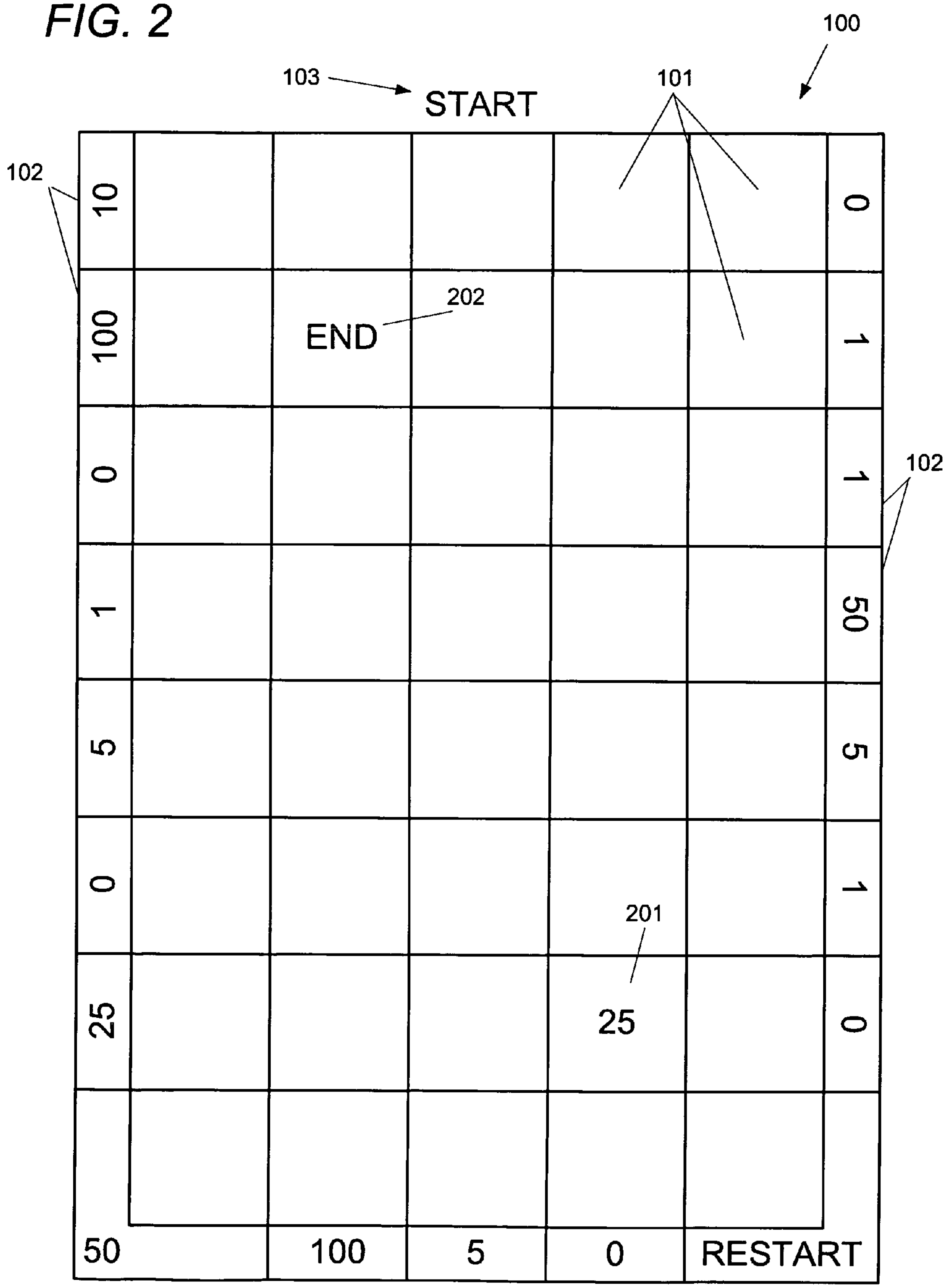
FIG. 2 is a somewhat diagrammatic representation of an alternate decision field that may be displayed according to the present invention.

It will be appreciated that decision field 100 is shown only as a simple example which may be used to describe the features of the present invention. Numerous variations are possible on this basic graphic structure. For example, the decision field may not comprise a linear array of grid locations such as the array of square locations 101 shown in FIG. 1. Rather, the decision field locations may be arranged in any suitable manner which may or may not show discrete locations such as the location 101 shown in FIG. 1. That is, decision fields within the scope of the invention may include locations that are not depicted graphically as having discrete boundaries. Furthermore, although a start location will be included in some forms of the invention, the starting location may not be at a peripheral point of the decision field. Rather, a start location may be at any one of the locations defined in the respective decision field. Other variations may involve the manner in which result tokens are included with the display. Particularly where the starting position is at an interior location in the decision field, it will be appreciated that the entire periphery of the decision field may include result tokens. Also, as shown in FIG. 2, result tokens may be included at locations within the interior of a decision field according to the invention. The example of FIG. 2 shows a 25 credit result token 201 near the lower right corner of the decision field, and an "end" result token 202 near the upper left corner of decision field 100. This "end" result token may be associated with a potential result that simply ends play without showing a credit or other result, and would represent another way of showing a losing result with no payout to the player.

Figure 3:
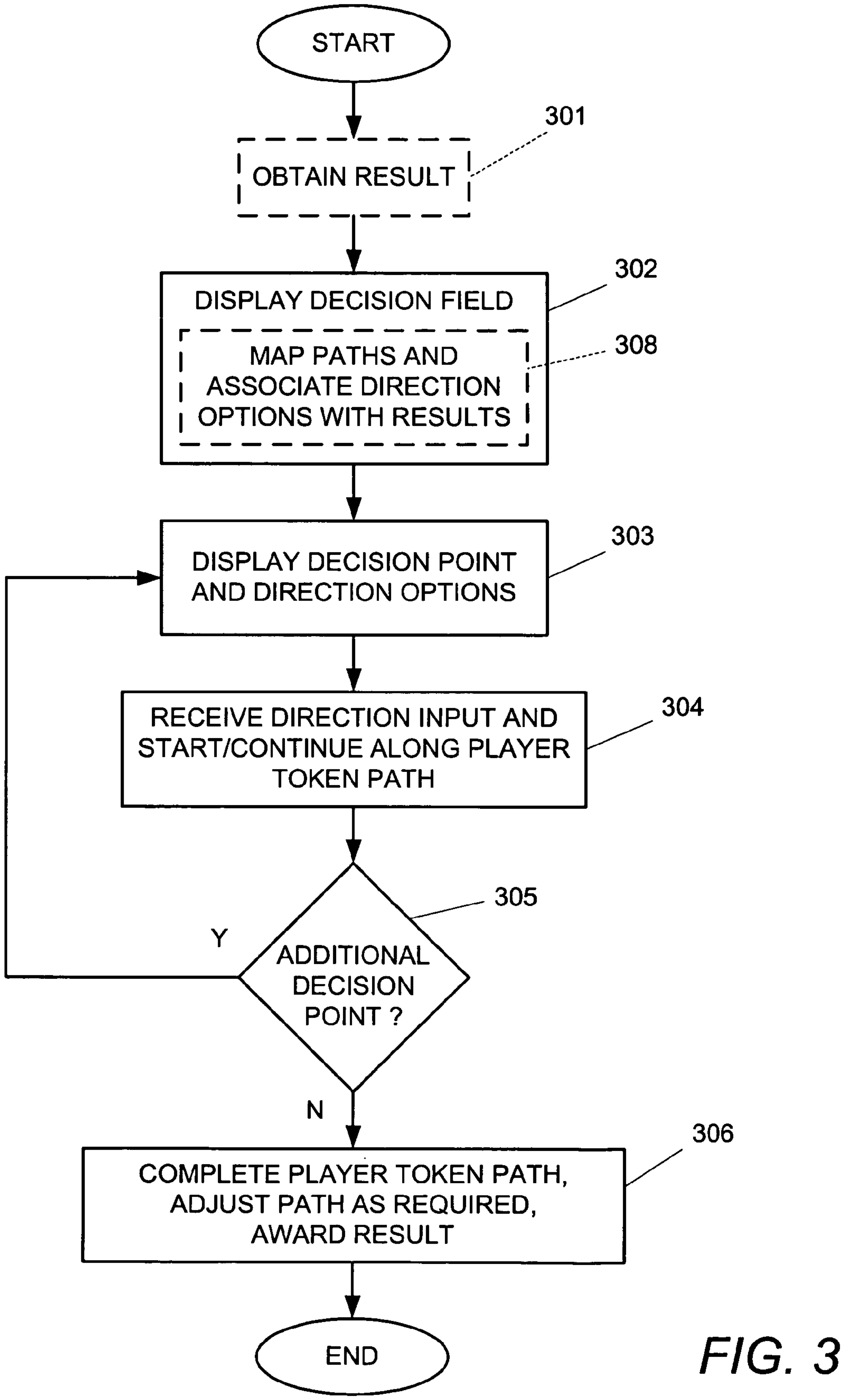
FIG. 3 is a flow diagram showing a method embodying the principles of the present invention.

FIG. 3 shows a flowchart which may be used to describe some preferred forms of the present invention. As indicated at process block 301 in FIG. 3, a method according to the invention relies on obtaining a result in some fashion. The step of producing or identifying the result obtained as indicated at block 301 may or may not be part of the present invention, and thus the step of a obtaining a result 301 is shown with a dashed box. That is, a result may be obtained from an entirely different process and supplied to a player station implementing the present invention. Also, it should be noted that the result need not be obtained at the particular location in the process shown in FIG. 3. Rather, in some forms of the invention, the result need not be obtained until it is necessary to complete the player token path as will be described below.

As indicated at process block 302, the invention includes displaying a decision field such as the example decision field 100 shown in FIG. 1. This step of displaying the decision field may be performed under the control of any suitable graphics control device and/or under the control of a suitable general purpose processor executing operational program code. In any event, the decision field is preferably displayed on a suitable display device associated with a player station.

After the decision field is displayed as indicated at process block 302, the invention includes displaying a decision point associated with two or more direction options within the decision field as indicated at process block 303. A decision point within the decision field may be at any point in the interior of the decision field or at any point along a boundary of the decision field, and may be indicated with any suitable graphic element. It will be noted that although the terminology "decision point" is used in this disclosure and the accompanying claims, the graphic element showing a decision point may cover a significant area of the display device and thus is not necessarily a "point" in the geometric sense. In any event, the direction options associated with the decision point graphically show the player two or more options from which the player may choose for a portion of a player token path as it traverses the decision field.

As indicated at process block 304, a method according to the invention includes receiving a direction input and then starting or continuing to move the player token along a player token path from the decision point. The direction input selects one of the direction options that was presented as indicated at process block 303. After receiving a first direction input, some forms of the present invention repeat the step of displaying a decision point and direction options. Thus, FIG. 3 shows a decision block 305 indicating that if additional decision points are to be displayed in the particular implementation, the process loops back to block 303 for the next decision point and direction options to be displayed. Otherwise, if no additional decision points are to be displayed, the process includes completing the player token path and ultimately awarding a result as indicated at process block 306.

The invention encompasses numerous variations on this basic series of steps shown in FIG. 3. For example, some preferred forms of the invention include a step of mapping paths through the decision field and associating each path with a direction option and with a respective result. This path mapping and result association step is shown at process block 308 in FIG. 3. Because this path mapping is an optional aspect of the invention, block 308 is shown in dashed lines similar to block 301. It will be noted also that in the event that paths are mapped and direction options are associated with results as indicated at process block 308, the process will require that one or more results must be obtained before or as part of the mapping/result associating process. Thus, in these cases, the result obtaining step shown at block 301 will be performed prior to mapping or as part of mapping. Path mapping and associating results with direction options will be described further below in the context of a specific example shown in FIG. 8.

Depending upon when a result for a play of the game is obtained and depending upon how paths are associated with the various direction options available at a given decision point, a process according to the invention may include adjusting a player token path. This adjustment step is indicated as one of the steps performed at process block 306 in FIG. 3. For example, a result to be awarded to the player might not be known at the time the player makes their direction input and the player token is started upon the selected path portion as indicated at block 304 in FIG. 3. If a result to be awarded is obtained only after starting along a player token path, then the path will have to be adjusted so that it intersects a result token consistent with the obtained result. That is, if the result of a 5 credit payout is obtained at some point when a player token is being moved along a player token path, the path will have to be adjusted so that it intersects with a result token showing the 5 credit result. In other forms of the invention, direct options may be displayed at a decision point such that a player may naturally select a direction option that is associated with a player token path to the player's result for the game play. If the player selects a different direction option, the player token path associated with that direction option may need to be adjusted to intersect with a result token showing the correct result for the game play.

It should be noted that the graphic presentation according to the invention described in FIG. 3 may represent either a primary game play or a bonus game play. When used as bonus play, there will be some other type of game presentation that will represent a primary play. For example, a play in a physical or video reel-type presentation may show primary results, and the result presentation according to the invention may be used to depict a bonus play that occurs after a particular result or set of results in the reel-type presentation.

The series of FIGS. 4 through 7 together with the flowchart of FIG. 3 may be used to describe specific examples of methods embodying the principles of the present invention. These examples will use same decision field 100 shown in FIGS. 1 and 2, made up of decision field locations 101 and including result tokens 102 and start location 103. However, it should be borne in mind that decision filed 100 is used in the examples just for purposes of convenience and that a broad variety of decision fields may be used in methods according to the invention.

Figure 4:
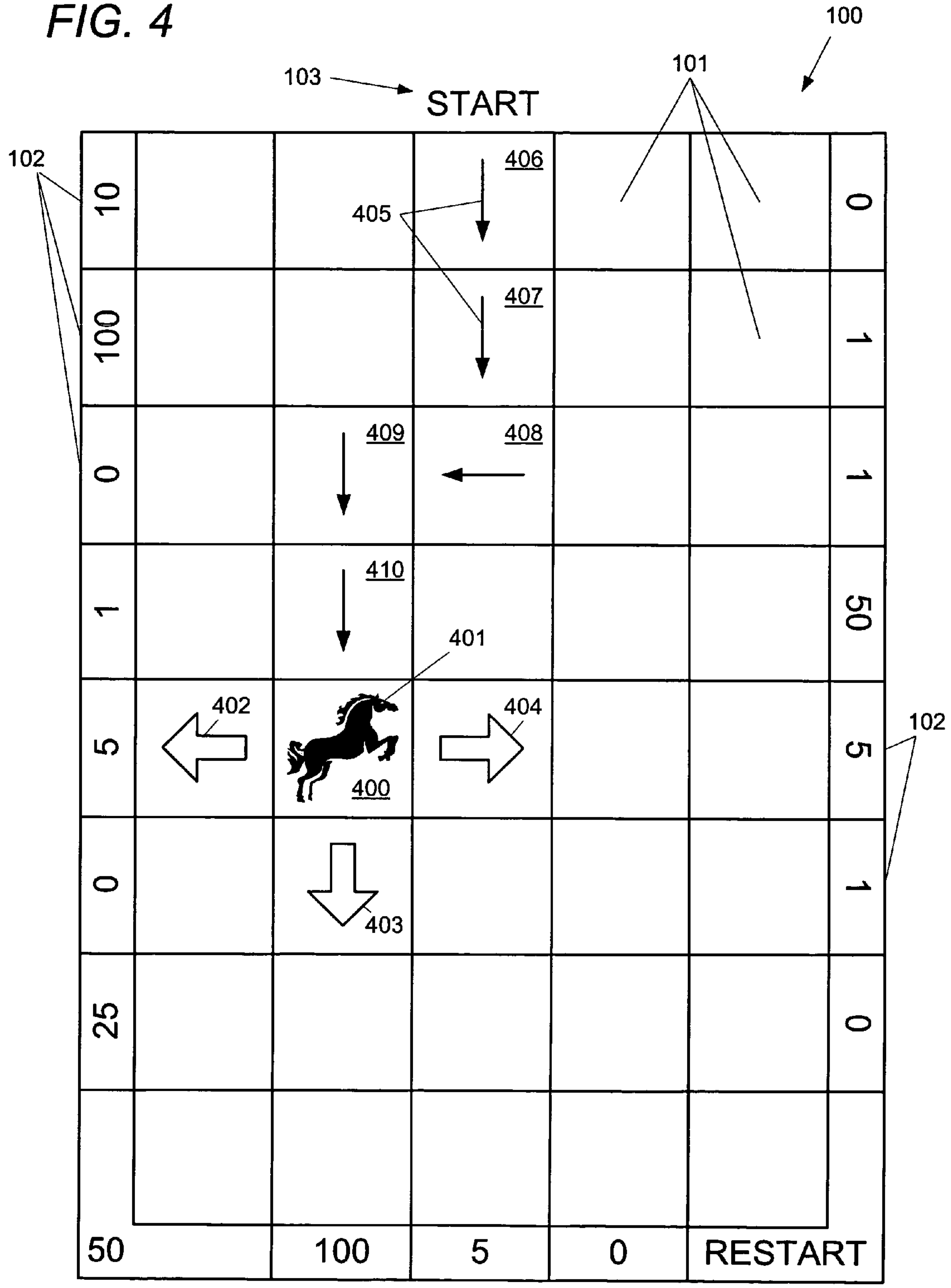
FIG. 4 is a diagrammatic representation of the example decision field shown in FIG. 1, but showing a portion of a player token path taken from a starting point to a decision point, and showing the direction options available at the decision point.

Referring to FIG. 4, decision field 100 is displayed on a suitable display device for a player, preferably at a player station the player is using to participate in a game. This decision field display step corresponds to the step shown at block 302 in FIG. 3. In addition to decision field 100, the method includes displaying a decision point shown at reference numeral 400 in FIG. 4. The step of displaying decision point 400 corresponds to the step shown at block 303 in FIG. 3. The illustrated decision point 400 comprises a particular one of the decision field locations 101, and will be shown commonly with some suitable graphic to distinguish the particular DECISION field location from others. The example graphic shown in FIG. 4 includes a player token 401 at decision point 400. This player token graphic may be flashing or have any suitable effects associated with it to help signify to the player that a decision point is being displayed and that player action is required. The action required will be for the player to make a suitable direction input to select one of the displayed direction options shown in this example by arrows 402, 403, and 404 produced on the display device displaying decision field 100. It should be noted that although the present examples show each direction option by an arrow located in a respective decision field location adjacent to the location comprising the decision point 400, other forms of the invention may show direction options in some other fashion such as by arrows or some other graphic elements in the location comprising the decision point.

The embodiment shown in FIG. 4 also shows the start position 103 for the player token and a path that the player token took in order to reach decision point 400. Thus, in this embodiment of the invention, a player may initially be presented with a blank decision field 100 as shown in FIG. 1, and the player is prompted to operate some control associated with the player station to cause the player token to start a path through the decision field. It is also possible that a player token may start the path through the decision field 100 automatically without any input from the player other than some input such as a wager input or some other input indicating the player's desire to play the game. The solid path indicator arrows 405 shown in FIG. 4 and in the rest of the series of FIGS. 4 through 7 indicate the path of the player token through the decision field. In particular, path indicator arrows 405 indicate the direction in which the player token exits the respective decision field location 101 along a player token path. Such path indicator arrows 405 preferably would not actually appear on the display device, but are used in FIGS. 4 through 7 to provide a convenient way to show a path taken by the player token such as token 401. Thus, in the example shown in FIG. 4, the player token began at start location 103 and then entered decision field location 406 immediately below the start label. The player token then traveled to locations 407, 408, 409, and 410 in order before reaching decision point 400.

It will be appreciated that this illustrated embodiment in which the player token 401 starts at some decision field location and then traverses some path to a decision point is not required according to the invention. Rather, a player may be immediately presented with a decision point such as decision point 400 without showing any player token path before the decision point. For example, the start point 103 in FIG. 4 may itself comprise a decision point at which the player may be presented with two or more different direction options originating from that decision point. Also, there may be numerous variations within the scope of the invention for showing a starting point and path to a decision point. One form of the invention may allow a player to control the movement of the player token along a path from a starting point such as point 103 in FIG. 4. The method will then cause a decision point to be displayed in a particular decision field location 101 along the path controlled by the player.

At the point in the game shown in the example of FIG. 4, the player is enabled to make a direction input through the player station that is associated with the display device showing decision field 100 and other elements of the graphic display. This direction input has the effect of selecting one of the direction options associated with decision point 400. In this case, the player is enabled to select between direction option 402, direction option 403, and direction option 404. Each of these direction options 402, 403, and 404 is associated with a respective portion of a player token path so that the particular direction option selected by the player determines at least the start of the path that player token 401 takes from decision point 400. The direction input may be made in any manner supported by the player station at which decision field 100 is displayed. For example, the player station display device on which decision field 100 is displayed may comprise a touchscreen display and the player may make their direction input by physically touching the location associated with the respective direction option 402, 403, or 404. Alternatively, the player may use some pointing device (such as a mouse, track ball, or joystick for example) associated with the player station display device on which decision field 100 is displayed in order to make the required direction input. The invention is not limited to any particular arrangement for enabling the player to make the required direction input to select one of the direction options associated with the given decision point.

Figure 5:
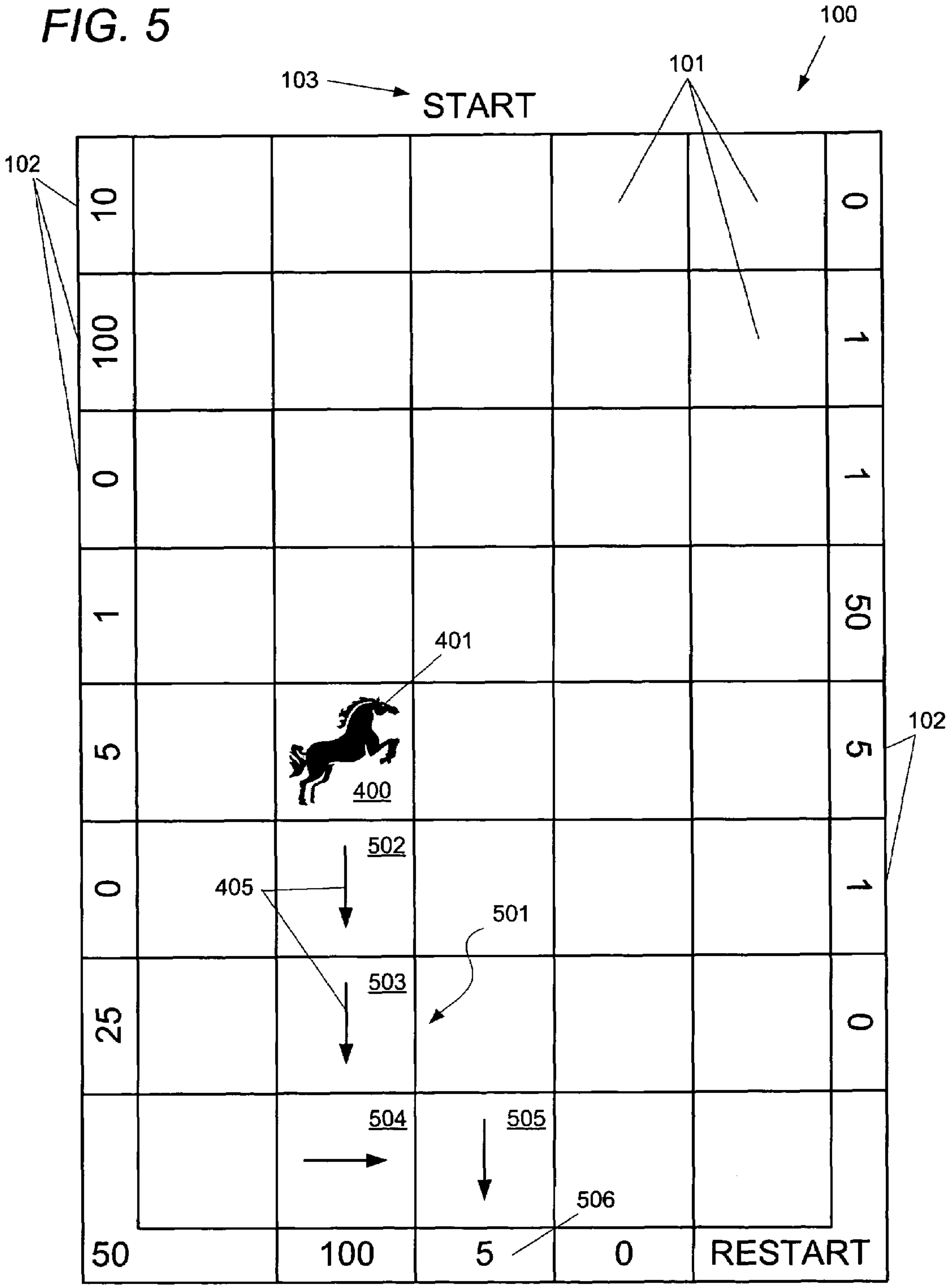
FIG. 5 is a diagrammatic representation similar to FIG. 4, but showing the portion of the player token path taken from the decision point to a result token showing the result to be awarded to the player.

The form of the invention illustrated with FIGS. 4 and 5 next includes receiving the player direction input and causing player token 401 to traverse decision field 100 along a portion of a player token path in response to the direction input. This step of receiving a direction input and starting the player token along the player token path, or causing it to continue along the path where a portion of the path up to the DECISION point has already been shown, corresponds to the steps shown at process block 304 in FIG. 3. FIG. 5 shows the path taken in response to the player's direction input. This path is shown generally in FIG. 5 by reference numeral 501 using path indicator arrows 405. In the example of FIG. 5, it is assumed that the player uses their direction input to select direction option 403 (shown in FIG. 4). As indicated in FIG. 5, player token path portion 501 originates from decision point 400 and moves sequentially through decision field locations 502, 503, 504, and 505. Player token 401 then exits decision field location 505 intersecting with the respective result token shown at 506 in FIG. 5. The method according to the invention includes awarding the player the potential result displayed at result token 506 that has been intersected by player token path 501. This process of completing the player token path and awarding the player the indicated potential result corresponds to the steps indicated at process block 306 in FIG. 3.

Figure 6:
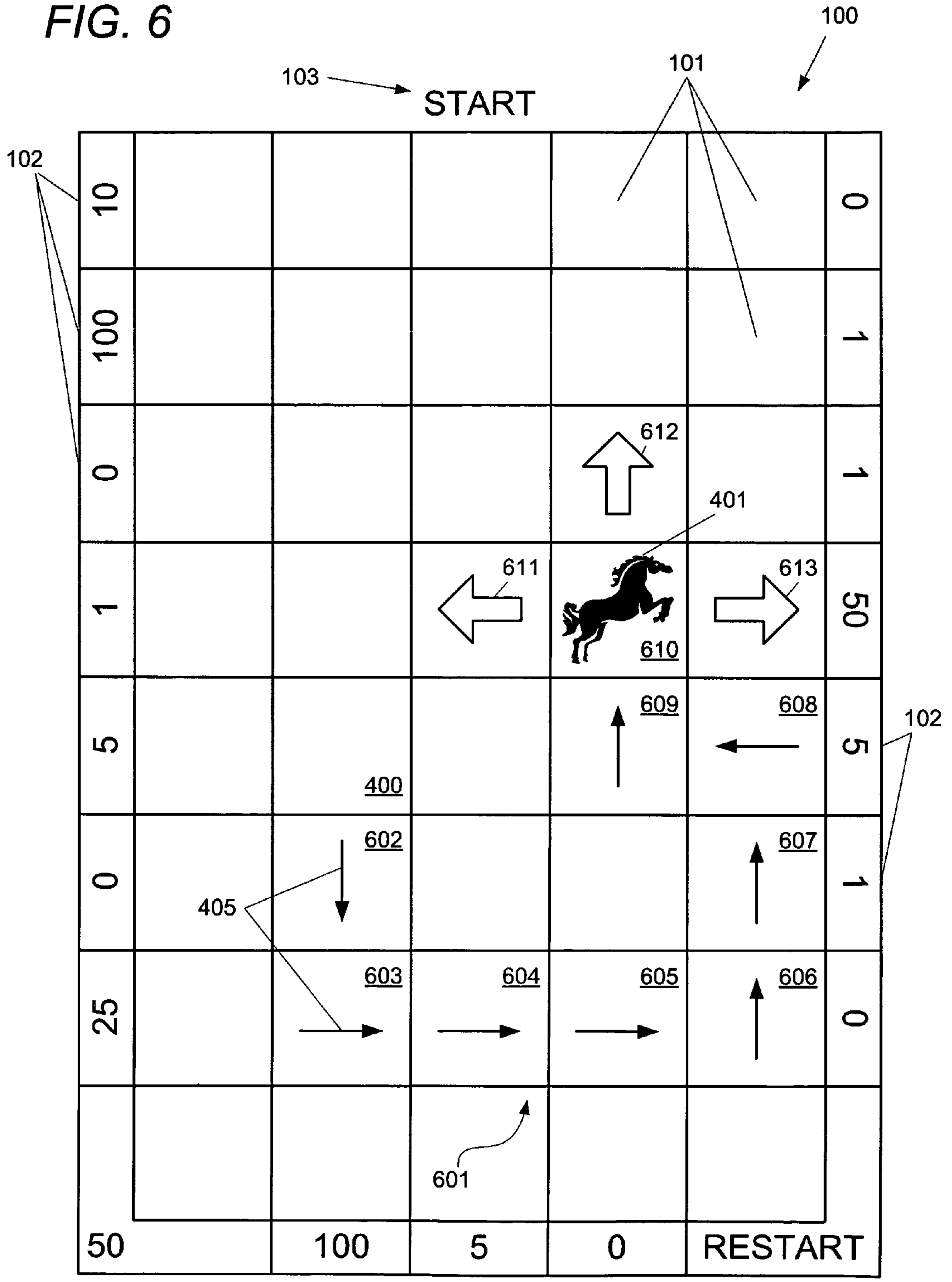
FIG. 6 is a diagrammatic representation similar to FIG. 4, but showing the portion of the player token path taken from the decision point to an additional decision point.
Figure 7:
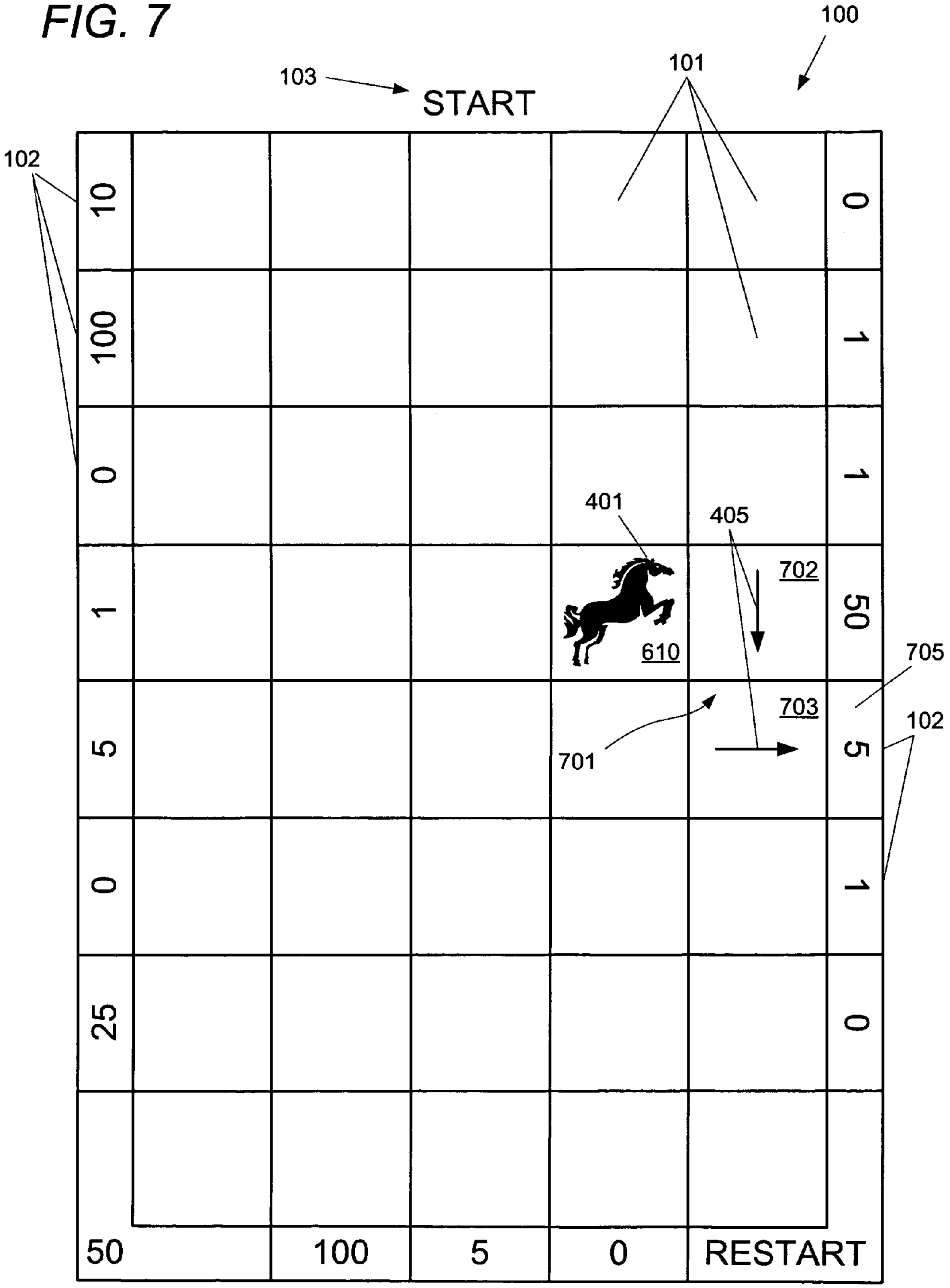
FIG. 7 is a diagrammatic representation similar to FIG. 6, but showing the portion of the player token path taken from the additional decision point to a result token showing the result to be awarded to the player.

A method embodying the principles of the invention may be completed upon awarding the potential result shown at the end of the player token path as indicated in FIG. 5. However, other forms of the invention may include displaying one or more additional decision points in decision field 100 before awarding the result for the play. FIGS. 6 and 7 will be used to show a second decision point in addition to the decision point 400 shown in FIG. 4. FIG. 6 starts again from the decision point 400 shown in FIG. 4 and shows an example player token path portion 601 taken to an additional decision point 610. As in the example of FIG. 5, it is assumed again for FIG. 6 that the player's direction input has selected direction option 403 shown in FIG. 4. However, rather than taking path 501 to a result token as shown in the single decision point example of FIG. 5, path portion 601 shown in FIG. 6 proceeds as indicated by the path indicator arrows 405 through a series of decision of field locations comprising locations 602, 603, 604, 605, 606, 607, 608, and 609, in order to reach additional decision point 610. Similarly to the arrangement shown in FIG. 4, this additional decision point 610 is associated with three direction options, additional direction options 611, 612, and 613. As in the example shown in FIG. 4, these three direction options are represented in FIG. 6 by arrow symbols.

Continuing on with this example in FIG. 7, it is assumed that the player has made an additional direction input to select direction option 613 shown in FIG. 6. This selection of direction option 613 causes player token 401 to traverse the decision field 100 along a player token path portion shown generally at 701 in FIG. 7. The path is again shown by path indicator arrows 405 and shows the player token moving from decision point 610 to decision field locations 702 and 703. Finally, player token path portion 701 intersects with the potential result token shown at 705. The method then includes awarding the player the potential result displayed at result token 705. In this case, the player is awarded five credits shown at the example result token 705.

Several important advantages of the present invention will be apparent from the examples shown in FIGS. 4 through 7. One feature of the invention that may be particularly attractive to some players is that some if not all of the results that are potentially available for a play in the game are displayed to the player before the player's actual result for the play is communicated to the player. Thus, the player may see, for example, that they may win a large prize such as "100" as a result of playing the game. An associated feature of the invention results from a combination of showing potential results and also showing the player token path progressing across decision field 100. In particular, the player token path may be formulated according to the invention so that it shows the player token approaching a high-value result even though the actual result to be awarded to the player may be significantly lower. Path portion 501 in FIG. 5 is a good example of such a player token path. As a player token progresses through decision field locations 502, 503, and 504, it will appear to the player that the path is heading for the high-value prize of "100" shown at potential result token 506. However, at the last second, path portion 501 turns to decision field location 505 and then intersects result token 506. It will be appreciated that a good deal of player excitement may be generated as the player watches the player token traversing decision field 100 along path portion 501 toward the high-value prize "100." Similarly, a player token path portion may be defined according to the invention so that it appears to be approaching a relatively low value prize or even a loss that may be adjacent to a high-value prize associated with an adjacent result token. In this case, the player may see the player token proceeding toward the low-value prize but will always have in the back of their mind the hope that the path may change at the last moment to intersect the result token associated with the higher value prize.

Another advantage of the present invention is that it provides a high level of player participation in the game. That is, the player is presented with one or more decision points such as decision point 400 and decision point 610, each associated with two or more direction options which may be selected by the player. Allowing the player to make selection inputs in the course of play may give the player the feeling that they have greater control over the game and their results for the play. It will be appreciated, however, that the player's selection of a direction option may not in fact affect the player's result in the game. The player's result may have already been determined as indicated at process block 301 in FIG. 3. Alternatively, the result may be obtained after the player makes the direction input to select a direction option and then the player token path may be generated to reach that particular result. In this case the player's selection of a given direction option again does not affect the player's result.

Figure 8:
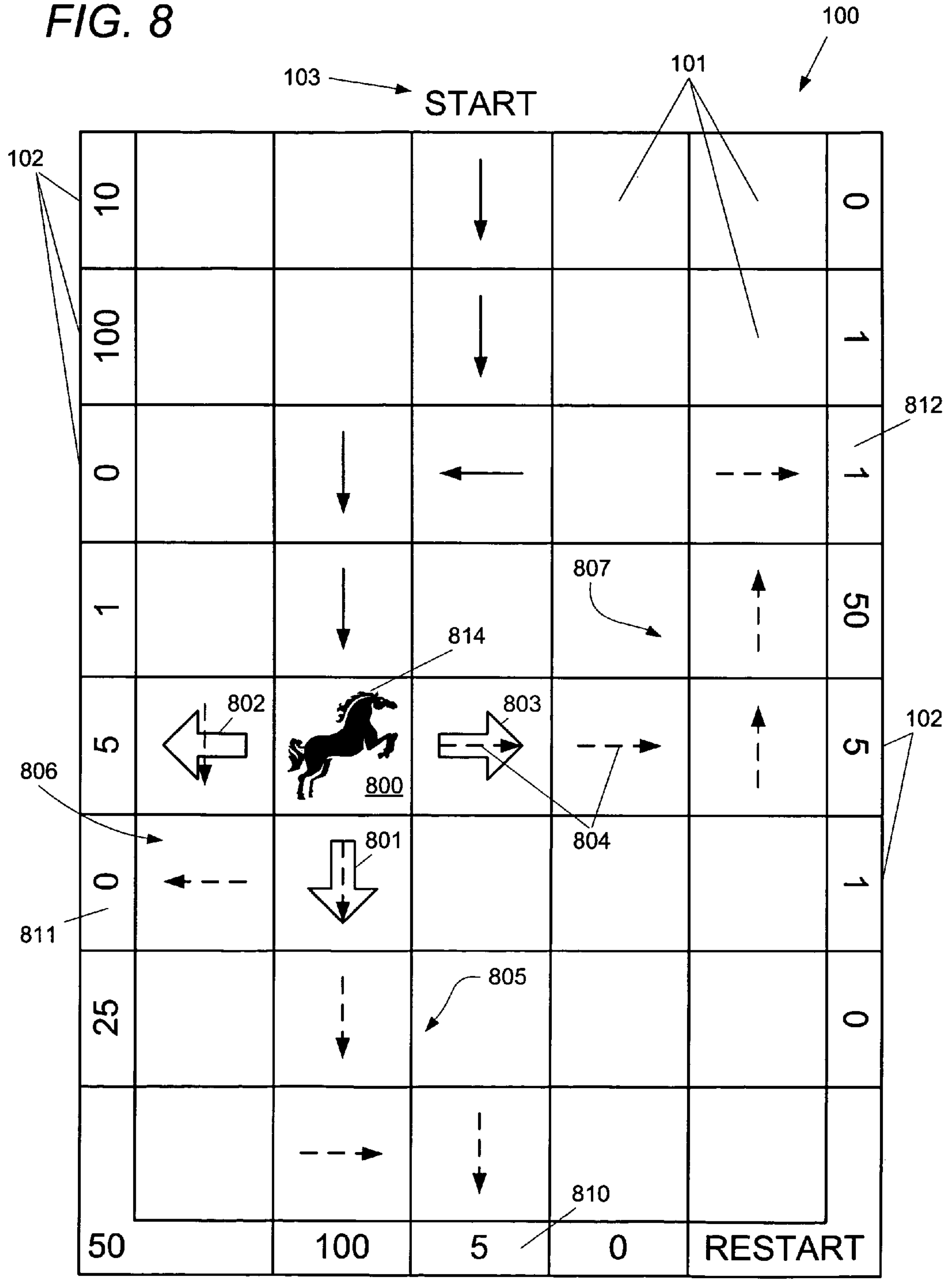
FIG. 8 is a diagrammatic representation similar to FIG. 4, but showing player token path mapping from the decision point according to one preferred form of the present invention.

Some forms of the invention may be implemented such that the player's selection of a given direction option at a decision point, such as decision point 400 in FIG. 4 and decision point 610 in FIG. 6, does in fact affect the player's result for the play in the game. FIG. 8 may be used to describe such an implementation of the present invention. This form of the invention includes mapping a respective path portion for each direction option associated with a decision point. As shown in FIG. 8, the display device used to produce the graphic display elements according to the invention is controlled to display a decision point 800 associated with three different direction options 801, 802, and 803 indicated by arrows similar to direction options 402, 403, and 404 shown in FIG. 4. In this form of the invention however, each direction option is mapped to a potential path portion shown by dashed path indicator arrows 804. In particular, potential path portion 805 is associated with direction option 801, path portion 806 is associated with direction option 802, and path portion 807 is associated with direction option 803. It will be noted that potential path 805 associated with direction option 801 ultimately intersects with resulted token 810 which shows the potential result of five credits. Potential path 806 associated with direction option 802 ultimately intersects result token 811 which shows the potential result of 0 credits, that is, a loss on the game play. Potential path portion 807 associated with direction option 803 ultimately intersects potential result token 812 showing the potential result of one credit. This one credit potential result may be lower or higher than the player's wager for playing the game or may be equal to the wager. Of course, the potential paths 805, 806, and 807, are not shown to the player prior to their making an input to select one of the direction options 801, 802, or 803. Rather, the potential paths 805, 806, and 807 are illustrated with dashed path indicator arrows 804 in FIG. 8 only for illustrating the path the player token 814 will take if the respective direction option is selected in this particular variation of the invention. It will be apparent from the three different potential player token paths 805, 806, and 807 shown in FIG. 8, that the player's selection of one of the direction options 801, 802, or 803 has a direct impact on result that will be awarded to the player for the play.

It will now be helpful to discuss further the step of obtaining a result shown at process block 301 in FIG. 3. When the method is implemented as shown in FIG. 8, the step of obtaining results actually includes obtaining three separate results that represent potential results that may be awarded depending upon which direction option is selected by the player. As indicated briefly above, the step of obtaining these results may be performed prior to even displaying decision field 100 and decision point 800, and the potential paths 805, 806, and 807 may be mapped prior to even displaying direction options 801, 802, and 803. Alternatively, the paths may be mapped as indicated at dashed box 308 in FIG. 3 after displaying decision point 800 and even after receiving the direction input to select a given one of the direction options 801, 802, or 803. That is, the processing arrangement which performs the path mapping may be sufficiently quick to map paths after a player has selected a direction option. In any case, the potential results obtained for a play should be associated with the direction options in a consistent manner that has no bearing on the result ultimately awarded to the player.

The invention encompasses obtaining results in any suitable fashion. For example, each respective result, such as the results obtained for direction options 801, 802, and 803 shown in FIG. 8, may be obtained from a lottery game. These multiple lottery results may, for example, be selected in accordance with U.S. patent application Ser. No. 10/919,209, the entire content of which is incorporated herein by reference. Alternatively, results may be obtained from one or more bingo games. As a further alternative, results may be generated randomly according to some algorithm performed at the player station or at some component external to the player station. If results are generated randomly, the results may be generated and then the potential paths mapped to the results. Alternatively, the path mapping process may in fact identify the potential results. That is, and algorithm may be used to randomly produce a path and the result token or tokens which the path intersects represent the random results associated with that path.

The example displays shown in FIGS. 1, 2, and 4 through 8 are shown only as convenient examples for describing the principles of the invention. Many variations on these basic examples may be employed within the scope of the present invention. In particular, the invention is not limited to any particular manner for displaying a decision field, result tokens, a player token, decision points, direction options, or player token paths as described above. In particular, numerous graphic effects may be used to display these various elements. For example, various graphic symbols may flash or include some type of animation. As another example, some forms of the invention may employ an animated player token that walks, slithers, flies, or otherwise appears to propel itself along the desired player token path. The decision field and other graphic components, such as the player token, may also each be shown as a three-dimensional image. Furthermore, some forms of the invention may show multiple levels of decision fields with the player token moving from one level to the next along the player token path. Of course, the direction options need not be shown at increments of 90 degrees to each other as shown in the simple example graphic displays. In fact, direction options may branch out in any suitable fashion from a single location or multiple locations associated with a decision point. The decision point itself may be portrayed in any suitable fashion to indicate to the player that a direction input is to be entered. A decision point may also span several locations in a decision field according to the invention rather than represent a single location as shown in the examples. The invention is not limited to presenting the direction options or other graphic components in any particular fashion.

Figure 9:
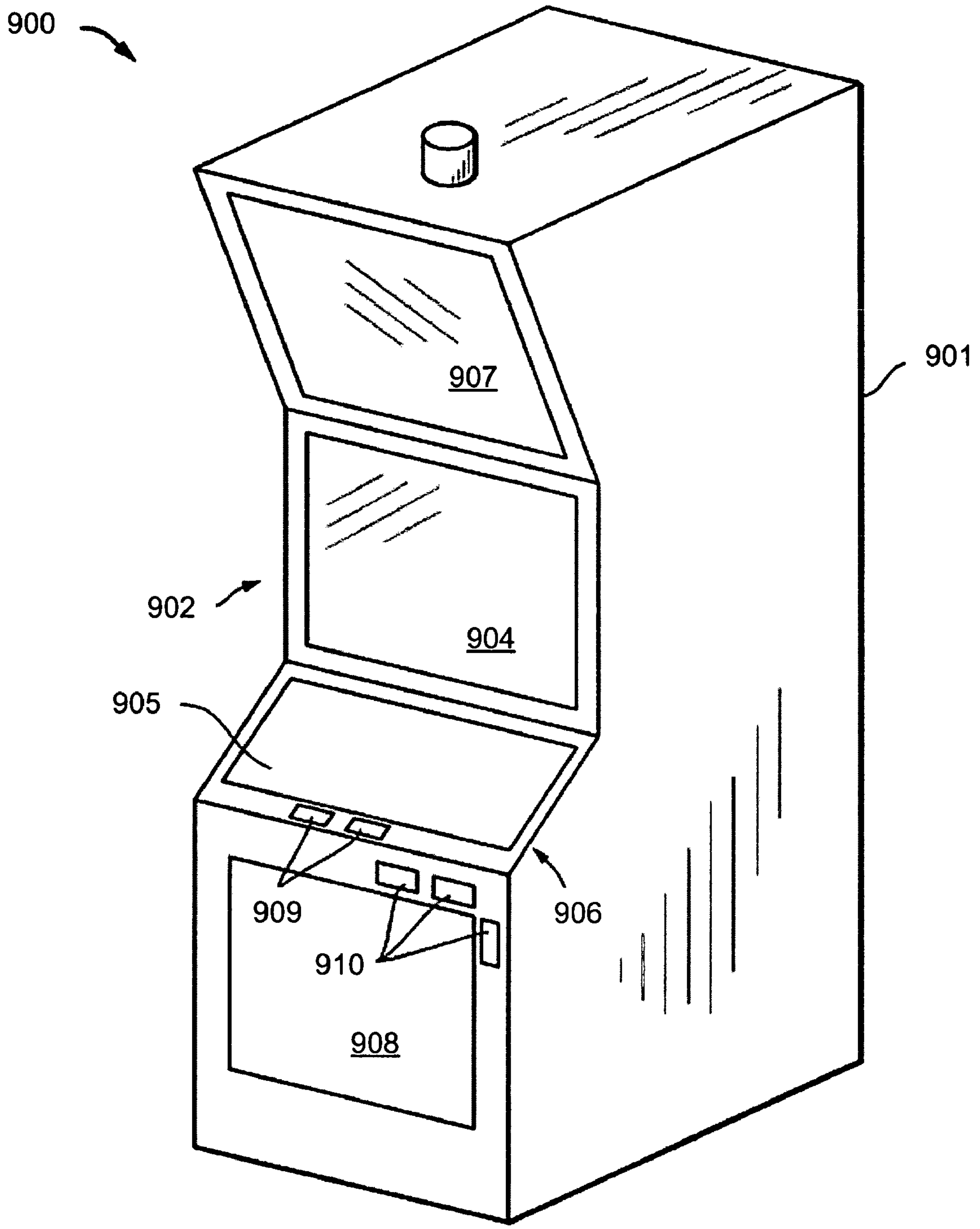
FIG. 9 is a perspective view of a player station that may be used in a gaming system according to the invention.
Figure 10:
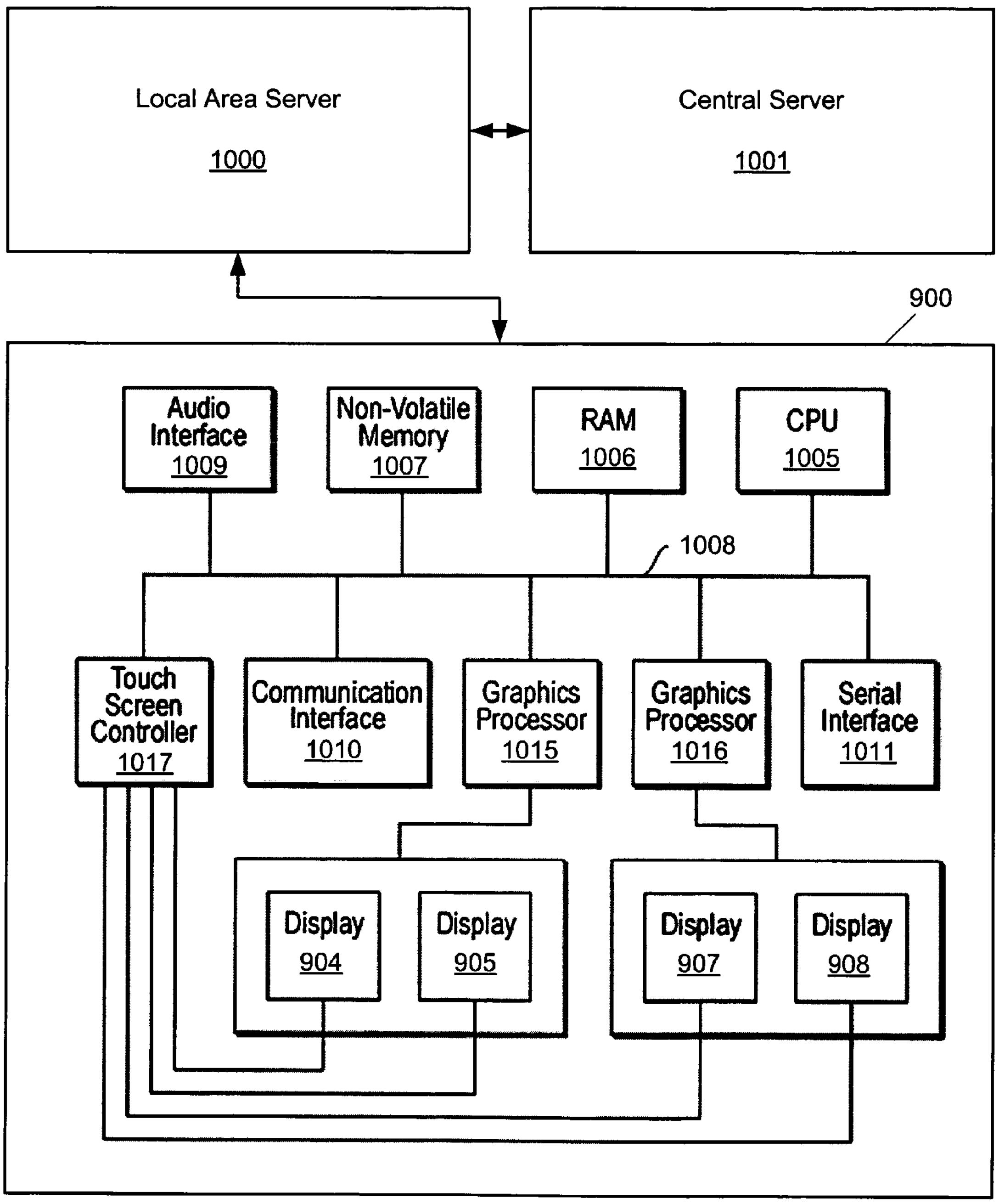
FIG. 10 is a diagrammatic representation of a player station and gaming system that may be used to implement methods according to the present invention.

FIG. 9 shows a player station 900 that may be used to implement methods according to the present invention. The block diagram of FIG. 10 shows further details of player station 900 connected in a gaining system in which the present invention may be used to present gaming results to players.

Referring to FIG. 9, a player station 900 includes a cabinet 901 having a front side generally shown at reference numeral 902. A game video display device 904 is mounted in a central portion of the front surface 902 with a ledge 906 positioned below the game video display device and projecting forwardly from the plane of the game video display device. In addition to the game video display device 904, the illustrated player station includes a first additional video display device 907 positioned on the front side of cabinet 901 above the game video display device, and a second additional video display device 908 mounted on the front side of the cabinet below the game video display device. Each of these display devices, the game video display device 904, first additional video display device 907, and second additional video display device 908 may participate in the operation of player station 900 to provide a game presentation for a player. In particular, one or more of the video display devices shown in FIG. 9 may be used to produce the graphic display of a decision field, result tokens, decision point, direction options, and player token as described above.

Player station 900 illustrated in FIG. 9, includes a player control touch screen display device 905 that forms a portion of the ledge 906 extending from the plane of game video display device 904. In addition to the separate player control touch screen display device 905, player station 900 also includes mechanical player control buttons or other input devices 909 mounted on ledge 906. Other forms of the invention may include switches, joysticks, or other player input devices mounted on ledge 906. However, all of the traditional player control inputs from devices such as switches, buttons, and pointer controls, can be provided through the illustrated touch screen display/player control device 905 and/or touch screen elements incorporated with the other display devices 904, 907, and 908 included in player station 900.

It will be appreciated that gaming machines may also include player interface devices in addition to devices that are considered player controls for use in playing a particular game. Player station 900 also includes additional player interface devices 910 on a lower portion of cabinet 901 generally in the plane of video display device 908. These additional player interface devices 910 may comprise for example, a player card reader, a voucher or ticket reader/issuer, a currency acceptor/validator, and/or coin or token acceptors/dispensers.

It should be noted that the present invention is by no means limited to implementation with the multiple display device player station 900 shown in FIG. 9. A game presentation made according to the present invention may be produced with any player station that includes a player interface for enabling a player to make direction inputs, and at least one video display device through which the decision field, decision point, direction option, player token, and any other graphic components may be produced. Player station 900 is merely shown as an example of a player station through which the invention may be implemented. Other player stations implementing the present invention may include other types of devices that may show game play results. For example, a player station may include a spinning wheel to show results or one or more physical reels. These result display devices may be used to show some gaming results to the player, while the presentation according to the invention may be used to show other results. It should also be noted that the video display devices used in player station 900 or some other player station that may be used to implement the invention may each comprise any suitable video display device including a cathode ray tube, liquid crystal display, plasma display, LED display or any other type of video display currently known or that may be developed in the future.

FIG. 10 provides a block diagram showing various components of player station 900 together with gaming system components external to the player station. In particular, FIG. 10 shows player station 900 connected for communication with a local area server 1000 and a central server 1001. Local area server 1000 and central server 1001 may be used together with player station 900 and other player stations to implement a bingo gaming system, such as the bingo gaming system described in U.S. patent application publication No. 2004-0152499-A1 or to implement a lottery gaming system such as the lottery gaming systems shown in U.S. patent application publication No. US 2005-0137010 A1 or U.S. Pat. No. 6,733,385, for example. Regardless of the precise manner in which results are identified in a given system, local area server 1000 and central server 1001, or both, may cooperate to identify results that are provided to player station 900 in response to a result requesting input entered at the player station. That is, local area server 1000 and/or central server 1001, or more particularly, one or more processing devices associated with server 1000 and/or server 1001 may serve as a result processor for identifying results that are obtained by player station 900 as described above with reference to block 301 in FIG. 3. Even in implementations in which results are produced at the player station 900 in some fashion, local area server 1000 and/or central server 1001 may be used to provide player tracking and accounting services for the player stations included in the gaming system.

The player station 900 shown in FIG. 10 includes a central processing unit (CPU) 1005 along with random access memory 1006 and non-volatile memory or storage device 1007. All of these devices are connected on a common system bus 1008 with an audio interface device 1009, communications interface 1010, and a serial interface 1011. Two graphics processors 1015 and 1016 are also connected on the common bus 1008 and are connected to drive the display devices mounted on cabinet 901 (shown in FIG. 9). Graphics processor 1015 controls game video display device 904 and player control display device 905 while graphics processor 1016 controls first additional display device 907 and second additional display device 908. The player station 900 shown in FIG. 10 also includes a touch screen controller 1017 connected to system bus 1008. Touch screen controller 1017 is also connected to receive signals from touch screen elements associated with each display device, 904, 905, 907, and 908. It will be appreciated that the touch screen elements themselves comprise thin films that are secured over the respective video display surface. These touch screen elements are not illustrated or referenced separately in the figures. It will also be appreciated that touch screen elements may not be associated with each display device.

Those familiar with data processing devices and systems will appreciate that other basic components will be included in player station 900 such as a power supply, cooling systems for the various processors, audio amplifiers and speakers, and other devices that are common in gaming machines. These additional devices are omitted from the drawings so as not to obscure the present invention in unnecessary detail.

All of the elements 1005, 1006, 1007, 1008, 1009, 1010, and 1011 shown in FIG. 10 are elements commonly associated with a personal computer. These elements are preferably mounted on a standard personal computer chassis and housed in a standard personal computer housing which is itself mounted in cabinet 901 shown in FIG. 9. Alternatively, the various processing elements may be mounted on one or more circuit boards mounted within cabinet 901 without a separate enclosure such as those found in personal computers. Those familiar with data processing systems and the various data processing elements shown in FIG. 10 will appreciate that many variations on this illustrated structure may be used within the scope of the present invention. For example, since serial communications are commonly employed from a touch screen element secured over a video display surface, a system according to the invention may not include a separate touch screen controller 1017. Rather, communications from the touch screen elements may be accommodated through any suitable peripheral interface such as a USB controller or a IEEE 1394 controller. Thus, the connections shown from touch screen controller 1017 to the various display devices may alternatively run from the display devices (or more precisely the touch screen elements associated with the display devices) to the serial interface 1011 or any other suitable interface. Numerous other variations in the player station internal structure and system may be used in accordance with the principles of the present invention.

It will also be appreciated that graphics processors are also commonly a part of modern computer systems. Although two separate graphics processors 1015 and 1016 are shown for controlling the four displays included in this form of the invention, it will be appreciated that a separate graphics processor may be included in the system for each particular display device. It is also possible for a single graphics processor to control all of the video display devices mounted on player station 900. It is also possible for CPU 1005 to control the display devices directly without any intermediate graphics processor. The invention is not limited to any particular arrangement of graphics processors for controlling the various gaming machine displays.

In the illustrated player station 900, CPU 1005 executes software which ultimately controls the entire player station including the receipt of player inputs and the presentation of the decision field, decision point, direction options, player token, and other graphic components through one or more of the video display devices associated with the player station. Thus, CPU 1005 either alone or in combination with one or more of the graphics processors 1015 and 1016 serves as a presentation processor according to the invention. Where the player station itself produces results for a player, CPU 1005 also serves as a result processor. CPU 1005 also executes software related to communications handled through communications interface 1010, and software related to various peripheral devices such as those connected to the system through audio interface 1009, serial interface 1011, and touch screen controller 1017. CPU 1005 may also execute software to perform accounting functions associated with game play. Random access memory 1006 provides memory for use by the central processing unit in executing its various software programs while the non-volatile memory or mass storage 1007 provides storage for programs not in use or for other data generated or used in the course of player station operation. Communications interface 1010 provides an interface to other components of a gaming system that may be involved in game play, such as local area server 1000 and/or central server 1001.

The software executed by CPU 1005 to implement the present invention preferably includes decision field program code, player interface program code, and player token control program code. The decision field program code is executable to cause one or more of the display devices 904, 905, 907, or 908 to display a decision field as described above with reference to FIG. 3 in connection with process blocks 302 and 303. The player interface program code is executable to receive a direction input initiated by a player as discussed above in connection with process block 304 in FIG. 3. The player token control program code is executable to display a player token in the decision field and to cause the player token to traverse the decision field along a player token path in response to the direction input as discussed above with reference to process blocks 304 and 306 in FIG. 3. CPU 1005, a processor associated with local area server 1000, or a processor associated with central server 1001, or some combination of these devices may also execute result identifying program code. This result identifying program code is executable to identify the game play result obtained as described in connection with process block 301 in FIG. 3. As discussed above, the results used in the invention may be identified in any suitable fashion. Thus, the result identifying program code may by executable to conduct a bingo game to identify the game play result, to identify the game play result from a respective lottery record selected from a group of electronic lottery records, or to generate the game play result from a result generating algorithm, for example.

In forms of the invention in which the player's choice of direction options actually does affect the result awarded to the player for their participation in the game, CPU 1005 or some other processing element in the gaming system may execute result correlation program code to correlate a first game play result to a first direction option associated with a given decision point and to correlate a second game play result to a second direction option associated with that decision point. In this case, the player token control program code will also cause the player token path to intersect a respective one of the result tokens that displays a respective potential result that is equal to the respective result correlated to the direction option selected by the player.

It should be noted that the invention is not limited to player stations employing the personal computer-type arrangement of processing devices and interfaces shown in example player station 900. Other player stations may include one or more special purpose processing devices to perform the various processing steps for implementing the present invention. Unlike general purpose processing devices such as CPU 1005, these special purpose processing devices may not employ operational program code to direct the various processing steps.

As used herein, whether in the above description or the following claims, the terms "comprising", "including", "carrying", "having", "containing", "involving", and the like are to be understood to be open-ended, that is, to mean including but not limited to. Only the transitional phrases "consisting of" and "consisting essentially of," respectively, shall be closed or semi-closed transitional phrases, as set forth, with respect to claims, in the United States Patent Office Manual of Patent Examining Procedures (Eighth Edition, August 2001 as revised May 2004), Section 2111.03.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A method including:

(a) displaying, on a display at an electronic player station, a decision field having a number of result tokens spaced apart at different locations about the decision field, each result token displaying a respective potential result;

(b) displaying a decision point within the decision field, the decision point being associated with two or more direction options;

(c) enabling a player to make a direction input at the electronic player station, the direction input selecting one of the direction options associated with the decision point;

(d) causing a player token to traverse the decision field along a player token path in response to the direction input, the player token path including a path portion associated with the selected direction option; and (e) awarding the player the potential result displayed by a respective one of the result tokens intersected by the player token path.

2. The method of claim 1 further including:

(a) displaying one or more additional decision points within the decision field, each respective additional decision point being associated with two or more additional direction options;

(b) enabling the player to make a respective additional direction input for each respective additional decision point, the respective additional direction input selecting one of the additional direction options associated with the respective additional decision point for which the respective additional direction input is made; and (c) causing the player token to traverse the decision field along a respective additional portion of the player token path in response to the respective additional direction input, the respective additional portion of the player token path being associated with the respective additional direction option selected by the player for the respective additional decision point.

3. The method of claim 1 wherein the result tokens are spaced apart along at least a portion of the periphery of the decision field.

4. The method of claim 1 wherein one or more result tokens are located in an interior portion of the decision field.

5. The method of claim 1 wherein the decision field comprises a representation of a two-dimensional area, where one or more locations about the decision field have three or more adjacent locations about the decision field, so that when the player token traverses the decision field, the player token moves directly from a respective one of the one or more locations to any of the respective three or more adjacent locations.

6. The method of claim 1 wherein the decision field comprises a representation of a three-dimensional area.

7. The method of claim 1 further including obtaining a result for a game play, mapping the player token paths and associating the direction options with the obtained result, and completing the player token path so that the player token intersects a result token having a potential result equal to the obtained result.

8. The method of claim 1 further including:

(a) correlating a first game play result to a first direction option associated with the decision point and correlating a second game play result to a second direction option associated with the decision point; and (b) causing the player token path to intersect a respective one of the result tokens that displays a potential result equal to the respective result correlated to the direction option selected by the player.

9. An apparatus including:

(a) a display device;

(b) a player input device;

(c) a presentation processor, the presentation processor for (i) causing the display device to display a decision field having a number of result tokens spaced apart at different locations about the decision field with each result token displaying a respective potential result, and to display a decision point within the decision field, the decision point being associated with two or more direction options, for (ii) receiving a direction input entered through the player input device, the direction input selecting one of the direction options associated with the decision point, for (iii) causing the display device to display a player token traversing the decision field along a player token path in response to the direction input, the player token path including a path portion that is determined by the direction option selected by the player through the direction input and intersecting a respective one of the result tokens displaying a respective potential result equal to a game play result to be awarded to a player.

10. The apparatus of claim 9 further including a result processor operatively connected for communication with the presentation processor, the result processor communicating the game play result to the presentation processor in response to a result requesting input entered through the player input device.

11. The apparatus of claim 10 wherein the display device, the player input device, and the presentation processor are associated with a player station and the result processor is located remotely from the player station.

12. The apparatus of claim 11 wherein the result processor conducts a bingo game to identify the game play result to be awarded to the player.

13. The apparatus of claim 11 wherein the result processor identifies the game play result to be awarded to the player from an electronic lottery record.

14. The apparatus of claim 9 wherein the presentation processor is also for generating the game play result to be awarded to the player according to a result generating algorithm.

15. A program product stored on one or more computer readable devices, the program product including:

(a) decision field program code executable to cause a display device to display a decision field having a number of result tokens spaced apart at different locations about the decision field and to display a decision point within the decision field, the decision point being associated with two or more direction options, and each result token displaying a respective potential result;

(b) player interface program code executable to receive a direction input initiated by a player, the direction input selecting one of the direction options associated with the decision point;

(c) player token control program code executable to display a player token in the decision field and to cause the player token to traverse the decision field along a player token path in response to the direction input, the player token path including a path portion determined by the direction option selected through the direction input and intersecting one of the result tokens displaying a respective potential result that is equal to a game play result to be awarded to the player.

16. The program product of claim 15 further including result identifying program code executable to identify the game play result.

17. The program product of claim 16 wherein the result identifying program code is executable to conduct a bingo game to identify the game play result.

18. The program product of claim 16 wherein the result identifying program code is executable to identify the game play result from a respective lottery record selected from a group of electronic lottery records.

19. The program product of claim 15 wherein the result identifying program code is executable to generate the game play result from a result generating algorithm.

20. The program product of claim 15 further including:

(a) result correlation program code executable for correlating a first game play result to a first direction option associated with the decision point and correlating a second game play result to a second direction option associated with the decision point; and (b) wherein the player token control program code is executable to cause the player token path to intersect a respective one of the result tokens that displays a respective potential result that is equal to the respective result correlated to the direction option selected by the player.

21. The method of claim 1, further including misdirecting a player by causing the player token to traverse the decision field along the path portion associated with the selected direction option, and then redirecting the player token along a second path portion different from the path portion associated with the selected direction option.

22. The method of claim 21, wherein the first path portion leads toward a first award amount, and the second path portion leads toward a second award amount, and the first award amount is greater than the second award amount.

23. The method of claim 7, wherein completing the player token path mapped to the obtained result requires an additional decision point associated with two or more additional direction options.

* * * * *